W. Nangel,
Mortising Machine.

N° 27,145.  Patented Feb. 14, 1860.

Witnesses:
Cha² Everett.
C. H. Slicer.

Inventor:
Walter Nangel

UNITED STATES PATENT OFFICE.

WALTER NANGEL, OF PHILADELPHIA, PENNSYLVANIA.

MORTISING-MACHINE.

Specification of Letters Patent No. 27,145, dated February 14, 1860.

*To all whom it may concern:*

Be it known that I, WALTER NANGEL, of the city and county of Philadelphia, in the State of Pennsylvania, have made certain new and useful Improvements in Mortising-Machines; and I hereby declare that the following is a full, clear, and exact description thereof, refernce being had to the accompanying drawings, making a part of this specification, in which—

Figure 4:
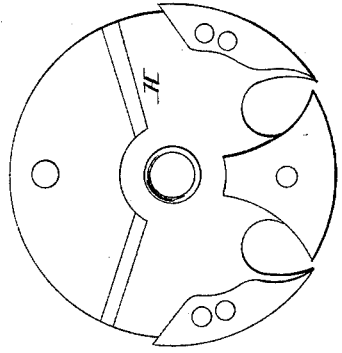
Figure 3:
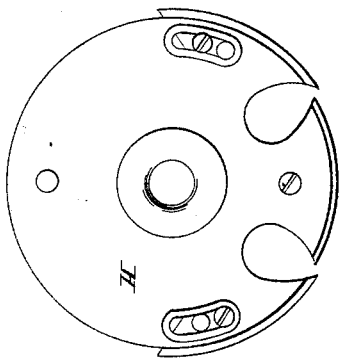
Figure 2:
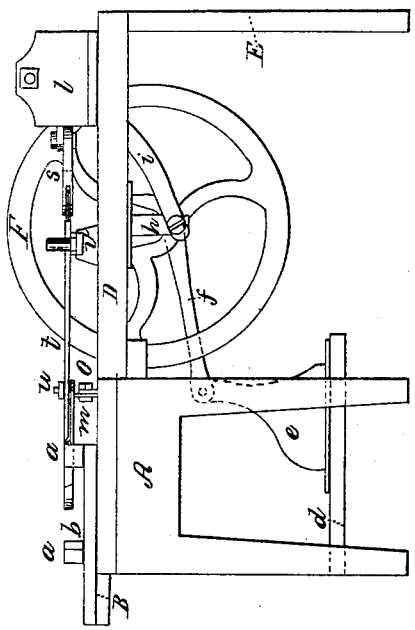
Figure 1:
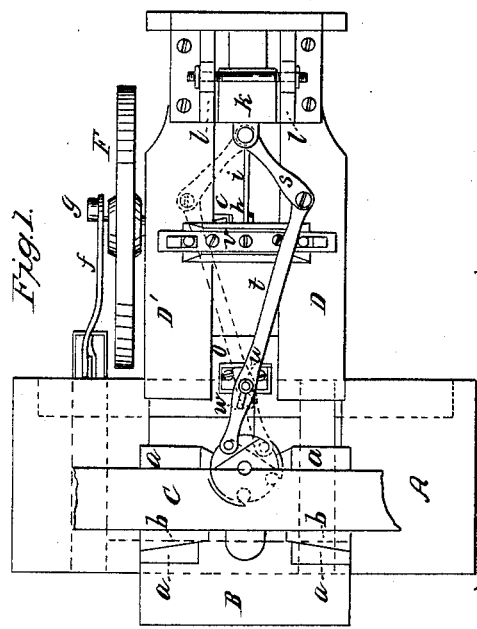

Figure 1 is a top view; Fig. 2 a side view; Fig. 3 a top view of the cutter stock; Fig. 4 a bottom view of the same and Fig. 5 a transverse section of Fig. 3.

The letters of reference indicate the same parts in the different figures.

The nature of my invention consists in the employment of rotary reciprocating cutters actuated by suitable machinery and devices for the purpose of forming mortises in the manner hereinafter described.

A is a bench or frame, upon which a sliding carriage B moves in suitable guides. Upon this carriage the piece C, which is to be mortised, is secured between the studs *a*, by wedges *b*.

Two pieces D and D' are framed into, and extend in the rear of the bench A, supported by the upright E. A crank shaft *c*, runs in bearings fixed to the under side of D'. It carries a fly wheel F keyed thereon. This shaft is actuated by the foot of the operator, through the agency of the treadle *d*, the upright arm *e*, connecting rod *f*, and crank pin *g* upon the fly wheel.

The crank *h*, upon the inner end of the shaft *c*, communicates, by means of the connecting rod *i*, a horizontal reciprocating motion to a sliding piece *k*, to which it is jointed and which traverses in the V shaped guides *l*, secured to D and D'. An upright arm O, is secured to the frame A, and sustains a rectangularly bent arm *m*, the vertical portion of which is secured to O, by a set screw passing through a slot, rendering it capable of elevation or depression, for the purpose of adjustment. The horizontal portion of the arm *m* sustains at its forward extremity the axis of a circular cutter stock H which rotates in a horizontal plane with a reciprocating motion, which is derived from the sliding piece *k*, by means of the jointed levers S and *t*; the former of which is jointed to *k*, and the latter to a point near the periphery of the cutter stock H. The lever *t*, has a movable fulcrum at *u*, formed by a vertical pin at the angle of the arm *m*, passing through a slot *w*. The lateral motion of the jointed levers S and *t* is limited by the adjustable studs in the cross piece V.

Figure 5:

The cutter stock H as shown in Figs. 3, 4 and 5, of a working size, is a disk of metal, armed with curved bits of the width of the required mortise, secured to its periphery, the cutting edges are placed in opposition to each other so that one cuts while the other recedes and vice versa. These edges are inclined to the plane of their motion that they may operate smoothly with a drawing cut. Portions of the disk are cut away to admit of its movement upon its supporting arm and its attachment to its actuating lever *t*, without increasing the aggregate thickness of the parts, beyond the width of the cutting bits. Other portions of the stock are removed to facilitate the disengagement of chips and shavings. The cutter bits are secured to the stock by screws which pass through slots, affording means of adjustment to compensate for their wear. The number of bits may be increased in some cases to advantage.

The machine thus constructed is operated by the foot. It is obvious that by the addition of proper gearing or pulleys and bands, other power may be substituted.

The piece (C) to be mortised, being fixed upon the sliding carriage B is pushed up to the cutter stock, which, previously gaged to the proper height moves with a rotary reciprocating motion, taking off shavings on both sides alternately until a mortise is formed to the depth required, the width being that of the bits used and the length corresponding with the diameter of the cutter stock, but if a greater length is required for the mortise the piece may be shifted laterally in the same plane, and another cut taken. The cutter bits being movable can be substituted by others of different widths adapted to the same stock. By presenting the wood at a proper inclination to the path of the carriage, bevel mortises may be made with facility at any angle desired.

Mortising in the manner above described by taking off shavings in the general direction of the grain of the wood presents many advantages over the usual mode of machine mortising by forcing chisels across the grain of the wood. Less power is required to produce the same effect, less wear and tear of machinery occurs, as there is little or no concussion. A portable machine may be constructed with my cutters for heavy work such as framing for buildings, bridges, &c., the mortises in which are now necessarily made by hand.

I do not confine myself to the above described arrangement of machinery for the operation of the cutters, nor to the precise construction of the cutter stock itself; but

What I claim as my invention and desire to secure by Letters Patent is—

The employment of rotary reciprocating cutters in mortising machines, substantially in the manner, and for the purpose set forth.

In testimony whereof I have signed my name to this specification before two subscribing witnesses.

WALTER NANGEL.

Witnesses:
CHAS. EVERETT,
W. CROPFIELD.